(12) United States Patent
Kajimura et al.

(10) Patent No.: US 10,197,280 B2
(45) Date of Patent: Feb. 5, 2019

(54) FUEL SPRAY NOZZLE

(71) Applicant: MITSUBISHI HITACHI POWER SYSTEMS, LTD., Kanagawa (JP)

(72) Inventors: Shuhei Kajimura, Tokyo (JP); Keijiro Saito, Tokyo (JP); Kei Inoue, Tokyo (JP); Kotaro Miyauchi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 14 days.

(21) Appl. No.: 14/762,509

(22) PCT Filed: Feb. 19, 2014

(86) PCT No.: PCT/JP2014/053835
§ 371 (c)(1),
(2) Date: Jul. 22, 2015

(87) PCT Pub. No.: WO2014/141830
PCT Pub. Date: Sep. 18, 2014

(65) Prior Publication Data
US 2015/0354825 A1 Dec. 10, 2015

(30) Foreign Application Priority Data
Mar. 11, 2013 (JP) ................................. 2013-047523

(51) Int. Cl.
*F02C 7/22* (2006.01)
*F23R 3/28* (2006.01)
(Continued)

(52) U.S. Cl.
CPC ................ *F23R 3/286* (2013.01); *F02C 7/22* (2013.01); *F23D 11/383* (2013.01); *F23R 3/14* (2013.01);
(Continued)

(58) Field of Classification Search
CPC ............ F02M 67/00; B05B 1/00; F23R 3/286; F02C 7/22; F23D 11/383
(Continued)

(56) References Cited

U.S. PATENT DOCUMENTS 2,044,296 A * 6/1936 Hardgrove .............. F23D 17/00
110/104 B
2,850,875 A * 9/1958 Wolfgang .............. D06M 11/38
431/351

(Continued)

FOREIGN PATENT DOCUMENTS

CN 1763434 4/2006
CN 1912470 2/2007
(Continued)

OTHER PUBLICATIONS

International Search Report dated May 20, 2014 in International Application No. PCT/JP2014/053835.
(Continued)

*Primary Examiner* — Chee-Chong Lee
(74) *Attorney, Agent, or Firm* — Wenderoth, Lind & Ponack, L.L.P.

(57) ABSTRACT

A fuel spray nozzle provided with: a liquid fuel channel (15), which is a channel for liquid fuel; a liquid fuel injection hole (19), which is a hole for communicating the liquid fuel channel (15) and the inside of a combustion burner, and injecting the liquid fuel into the combustion burner; an additive channel (14), which is a channel for an additive; and an additive injection hole (18*a*), which is a hole for communicating the additive channel (14) and the inside of the combustion burner, and injecting the additive into the combustion burner at an angle at which the additive collides with the liquid fuel injected from the liquid fuel injection hole (19).

2 Claims, 10 Drawing Sheets

(51) Int. Cl.
*F23R 3/14* (2006.01)
*F23D 11/38* (2006.01)

(52) U.S. Cl.
CPC ............... *F23C 2203/30* (2013.01); *F23C 2900/07021* (2013.01)

(58) Field of Classification Search
USPC .......................................................... 239/399
See application file for complete search history.

(56) References Cited

U.S. PATENT DOCUMENTS

| | | | | |
|---|---|---|---|---|
| 2,999,359 | A | * | 9/1961 | Murray ............... F23R 3/04 60/733 |
| 3,153,438 | A | * | 10/1964 | Brzozowski ............ F23D 17/00 239/401 |
| 3,254,846 | A | * | 6/1966 | Schreter ................ F23D 11/10 239/400 |
| 3,283,502 | A | * | 11/1966 | Lefebvre ................ F23R 3/14 60/739 |
| 3,703,259 | A | * | 11/1972 | Sturgess ................ F23D 11/10 239/400 |
| 2010/0269508 | A1 | | 10/2010 | Saito et al. |
| 2011/0197589 | A1 | | 8/2011 | Khosla et al. |
| 2012/0282558 | A1 | | 11/2012 | Kraemer et al. |

FOREIGN PATENT DOCUMENTS

| | | |
|---|---|---|
| CN | 101878395 | 11/2010 |
| CN | 102162643 | 8/2011 |
| CN | 102695919 | 9/2012 |
| JP | 54-90410 | 7/1979 |
| JP | 5-322122 | 12/1993 |
| JP | 06-66156 | 3/1994 |
| JP | 6-147418 | 5/1994 |
| JP | 11-311404 | 11/1999 |
| JP | 2002-38970 | 2/2002 |
| JP | 2006-112670 | 4/2006 |
| JP | 2009-133517 | 6/2009 |
| JP | 4476177 | 6/2010 |
| JP | 2011-163753 | 8/2011 |
| WO | 2009/069426 | 6/2009 |

OTHER PUBLICATIONS

International Preliminary Report on Patentability dated Sep. 15, 2015 in International Application No. PCT/JP2014/053835.
Office Action dated Apr. 25, 2016 in Chinese patent application No. 201480006788.5 (with English translation).
Office Action dated Jun. 13, 2016 in Korean patent application No. 10-2015-7020334 (with English translation).
German Office Action dated Aug. 10, 2018 in corresponding German Application No. 11 2014 001 226.2 with English translation.

\* cited by examiner

FUEL SPRAY NOZZLE

BACKGROUND OF THE INVENTION

1. Technical Field

The present invention relates to a fuel spray nozzle mounted inside a combustion burner of a gas turbine.

2. Description of the Related Art

In a combustion burner of a gas turbine, as a technology for NOx reduction, there is a demand for liquid fuel to be sprayed at a uniform fuel concentration distribution.

Furthermore, by mixing an additive, such as water, with liquid fuel, it is possible to reduce NOx emissions as a result of lowering flame temperature or as a result of a reducing action. Then, the more the mixing is accelerated, the more it is possible to reduce NOx emissions. Furthermore, at the time of the mixing, air is also mixed in at the same time, and it is possible to further reduce NOx emissions.

Pressurized spray air (air blast), a nozzle tip, and the like are used in the spraying of the liquid fuel and the additive.

FIG. 9 is a schematic arrow view illustrating an example of an interior of a conventional air-blast type combustion burner. In FIG. 9, arrows indicate the flow of compressed air, dashed line arrows indicate the flow of an injected additive, and long-dashed short-dashed line arrows indicate the flow of an injected liquid fuel. As illustrated in FIG. 9, a fuel nozzle 21 is provided inside an air-blast type combustion burner 20, and the fuel nozzle 21 is provided with a swirl vane 12, an additive injection hole 28 and a liquid fuel injection hole 29.

The liquid fuel injection hole 29 is a hole configured to inject liquid fuel into the combustion burner 20 (to the outside of the fuel nozzle 21).

The additive injection hole 28 is a hole configured to inject an additive into the combustion burner 20 (to the outside of the fuel nozzle 21).

The swirl vane 12 is a vane that is increasingly curved from upstream to downstream, so that it causes compressed air to swirl. In this manner, a vortex is generated in the compressed air and the additive injected from the additive injection hole 28 and the liquid fuel injected from the liquid fuel injection hole 29 are atomized. Furthermore, the additive injected from the additive injection hole 28 can be atomized by colliding with the swirl vane 12.

In this manner, in the conventional air-blast type combustion burner 20, the liquid fuel and the additive are sprayed using the compressed air and the swirl vane 12 of the fuel nozzle 21.

FIG. 10 is a schematic view illustrating an example of a conventional nozzle tip type combustion burner. In FIG. 10, dashed line arrows indicate the flow of the additive and a long-dashed short-dashed line arrow indicates the flow of liquid fuel. A fuel nozzle (not illustrated) is provided inside a nozzle tip type combustion burner 30, and the fuel nozzle is provided with an additive injection hole 28 and a nozzle tip 39 such as those illustrated in FIG. 10.

The additive injection hole 28 is a hole configured to inject the additive to the outside of the combustion burner 30.

The nozzle tip 39 is a nozzle provided on the tip of the fuel nozzle and configured to spray liquid fuel to the outside of the combustion burner 30.

In this manner, in the conventional nozzle tip type combustion burner 30, the liquid fuel is sprayed using the nozzle tip 39 at the tip of the fuel nozzle.

CITATION LIST

Patent Literature

Patent Literature 1: Japanese Unexamined Patent Application Publication No. H11-311404A

SUMMARY OF THE INVENTION

1. Technical Problem

In the above-described conventional air-blast type combustion burner, if only a vortex is created without using air, it is difficult to spray the liquid fuel and the additive, and furthermore, it tends to be difficult to accelerate the mixing of the liquid fuel and the additive. Then, when the spraying is performed by causing the additive to collide with the swirl vane 12, wear of the vane is accelerated.

In the above-described conventional nozzle tip type combustion burner, there is a risk of coking of the nozzle tip 39, and there is a problem that maintenance costs are increased due to tip replacement and the like.

JP 11-311404A listed above discloses a technology in which provided are a fuel nozzle and an atomizing cap that is disposed around the fuel nozzle and that has injection holes configured to inject at least one of water and steam, and some of the injection holes are inclined inward with respect to a center line of the atomizing cap and the others are parallel to the center line.

An object of the present invention is to provide a fuel spray nozzle that can accomplish NOx reduction at low cost.

2. Solution to the Problem

A fuel spray nozzle according to a first aspect of the present invention to resolve the above-described problems is a fuel spray nozzle that sprays liquid fuel and an additive inside a combustion burner of a gas turbine.

The fuel spray nozzle includes a liquid fuel channel for the liquid fuel; a liquid fuel injection hole configured to allow the liquid fuel channel and the inside of the combustion burner to communicate, and to inject the liquid fuel into the combustion burner; an additive channel for the additive; and an additive injection hole configured to allow the additive channel and the inside of the combustion burner to communicate, and to inject the additive into the combustion burner at an angle at which the additive collides with the liquid fuel injected from the liquid fuel injection hole.

A fuel spray nozzle according to a second aspect of the present invention to resolve the above-described problems is the fuel spray nozzle according to the first aspect of the present invention, wherein at least one of the liquid fuel injection hole and the additive injection hole is formed as a slit.

A fuel spray nozzle according to a third aspect of the present invention to resolve the above-described problems is the fuel spray nozzle according to the second aspect of the present invention, wherein the slit has a tapered shape.

A fuel spray nozzle according to a fourth aspect of the present invention to resolve the above-described problems is the fuel spray nozzle according to any one of the first to third aspects of the present invention, further including: a liquid fuel pressure equalization space provided between the liquid fuel channel and the liquid fuel injection hole, the liquid fuel pressure equalization space having the capacity to equalize the pressure of the liquid fuel that has flowed from the liquid fuel channel; and an additive pressure equalization space provided between the additive channel and the additive injection hole, the additive pressure equalization space having the capacity to equalize the pressure of the additive that has flowed from the additive channel.

A fuel spray nozzle according a fifth aspect of the present invention to resolve the above-described problems is the fuel spray nozzle according any one of the first to fourth aspects of the present invention, further including a swirl vane increasingly curved from upstream to downstream, so that air inside the combustion burner is caused to swirl.

According to the fuel spray nozzle according to the first aspect of the present invention, as the fuel spray nozzle is provided with the liquid fuel injection hole configured to allow the liquid fuel channel and the inside of the combustion burner to communicate and to inject the liquid fuel into the combustion burner and with the additive injection hole configured to allow the additive channel and the inside of the combustion burner to communicate and to inject the additive into the combustion burner at an angle at which the additive collides with the liquid fuel injected from the liquid fuel injection hole, an air blast, a nozzle tip, or the like is not necessary and NOx reduction can be accomplished at low cost.

According to the fuel spray nozzle according to the second aspect of the present invention, as at least one of the liquid fuel injection hole and the additive injection hole is formed as the slit, it is possible to further accelerate the mixing of the liquid fuel, the additive, and air, and further NOx reduction can be accomplished.

According to the fuel spray nozzle according to the third aspect of the present invention, the slit has the tapered shape, and thus it is possible to further accelerate the mixing of the liquid fuel, the additive, and air, and further NOx reduction can be accomplished.

According to the fuel spray nozzle according to the fourth aspect of the present invention, the liquid fuel pressure equalization space and the additive pressure equalization space are provided. Thus, even when each of the liquid fuel injection hole and the additive injection hole is provided in a plurality, as the respective pressures of the liquid fuel and the additive are equalized in the liquid fuel pressure equalization space and the additive pressure equalization space, it is possible to uniformly inject the liquid fuel and the additive from the respective holes.

According to the fuel spray nozzle according to the fifth aspect of the present invention, as the swirl vane increasingly curved from upstream to downstream is provided to cause air inside the combustion burner to swirl, a vortex is generated making it possible to further accelerate the mixing of the liquid fuel, the additive, and air, and to accomplish further NOx reduction.

DETAILED DESCRIPTION OF EMBODIMENTS

Hereinafter, embodiments of a fuel spray nozzle according to the present invention will be described with reference to the drawings.

First Embodiment

Figure 1:
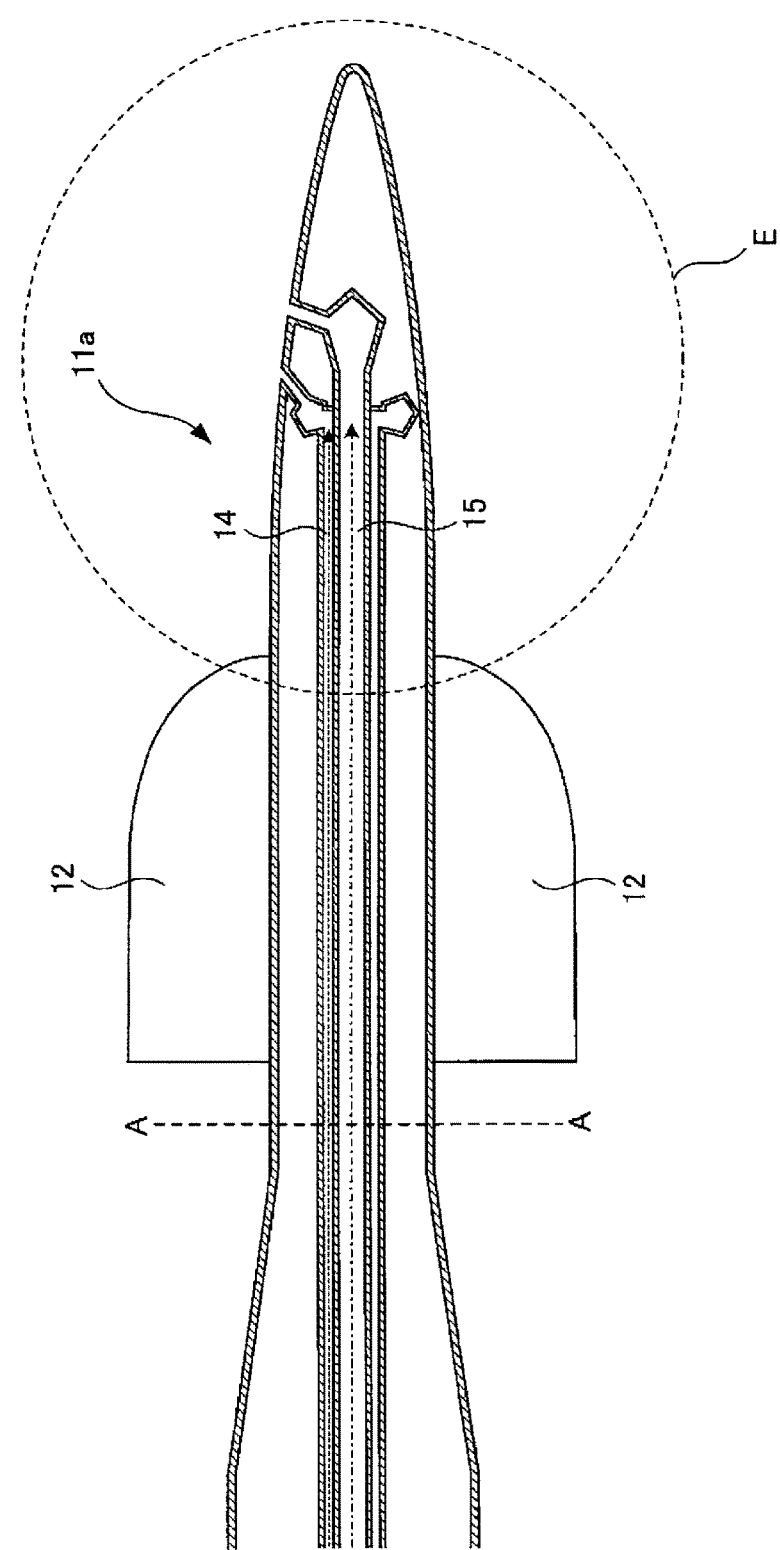
FIG. 1 is a schematic cross-sectional view illustrating a fuel spray nozzle according to a first embodiment of the present invention.
Figure 2:
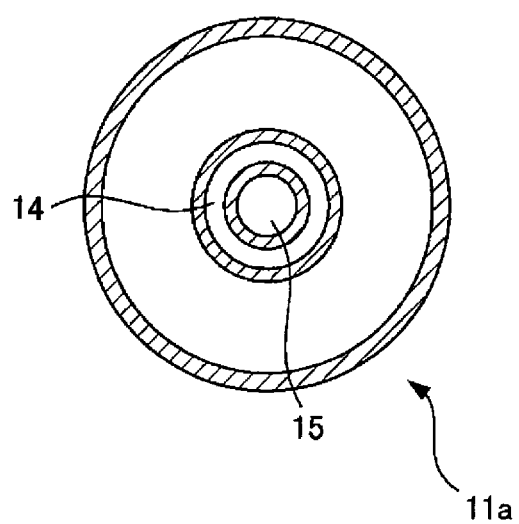
FIG. 2 is a cross-sectional view taken along line A-A in FIG. 1.
Figure 3:
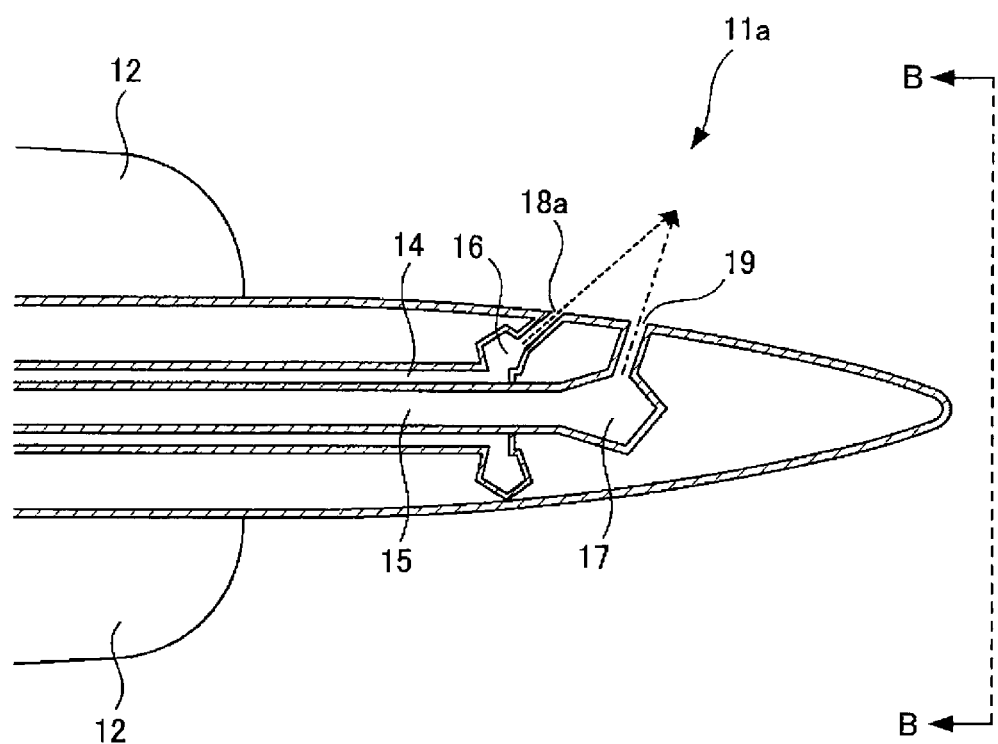
FIG. 3 is an enlarged view of a section E in FIG. 1.
Figure 4:
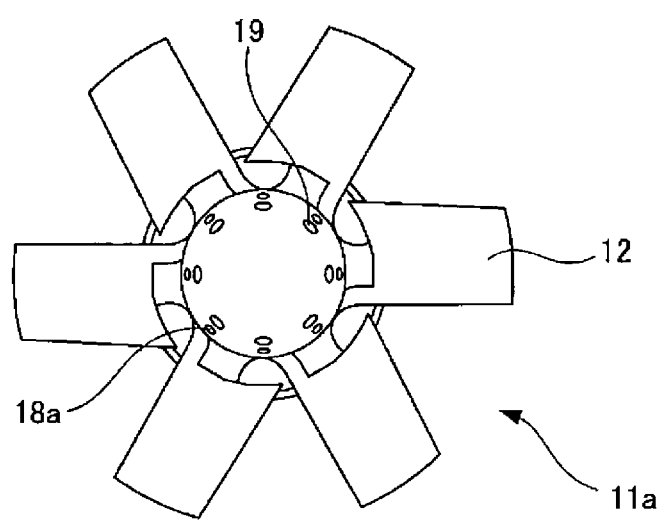
FIG. 4 is a view seen in the direction of arrows B-B in FIG. 3.

A fuel spray nozzle according to a first embodiment of the present invention will be described with reference to the drawings. FIG. 1 is a schematic cross-sectional view illustrating a fuel spray nozzle according to the first embodiment of the present invention. FIG. 2 is a cross-sectional view taken along a line A-A in FIG. 1. FIG. 3 is an enlarged view of a section E in FIG. 1. FIG. 4 is a view seen in the direction of arrows B-B in FIG. 3. Furthermore, dashed line arrows in FIG. 1 and FIG. 3 indicate the flow of additive and long-dashed short-dashed line arrows indicate the flow of liquid fuel.

A fuel spray nozzle 11a sprays liquid fuel and an additive inside a combustion burner (not illustrated) of a gas turbine. As illustrated in FIGS. 1 to 4, the fuel spray nozzle 11a is provided with a swirl vane 12, an additive channel 14, a liquid fuel channel 15, an additive pressure equalization space 16, a liquid fuel pressure equalization space 17, a first additive injection hole 18a and a liquid fuel injection hole 19.

As illustrated in FIGS. 1 to 3, the liquid fuel channel 15 is a channel for the liquid fuel provided inside the fuel spray nozzle 11a.

As illustrated in FIGS. 1 to 3, the additive channel 14 is a channel for the additive provided on the periphery of the liquid fuel channel 15.

As illustrated in FIG. 3, the liquid fuel pressure equalization space 17 is a space that is provided at an end portion of the liquid fuel channel 15, specifically, between the liquid fuel channel 15 and the liquid fuel injection hole 19, and that has the capacity to equalize the pressure of the liquid fuel that has flowed from the liquid fuel channel 15.

As illustrated in FIGS. 3 and 4, the liquid fuel injection hole 19 is a hole configured to allow the liquid fuel pressure equalization space 17 and the inside of the combustion burner (the outside of the fuel spray nozzle 11a) to communicate and to inject the liquid fuel into the combustion burner.

In FIG. 4, eight of the liquid fuel injection holes 19 are illustrated, but the present embodiment is not limited thereto, and there may be any number of the liquid fuel injection holes 19, as long as there is one or more. Even when there is a plurality of the liquid fuel injection holes 19, as the pressure of the liquid fuel is equalized in the liquid fuel pressure equalization space 17; it is possible to uniformly inject the liquid fuel from each of the holes.

As illustrated in FIG. 3, the additive pressure equalization space 16 is a space that is provided at an end portion of the additive channel 14, specifically, between the additive channel 14 and the first additive injection hole 18a, and that has the capacity to equalize the pressure of the additive that has flowed from the additive channel 14.

As illustrated in FIGS. 3 and 4, the first additive injection hole 18a is a hole configured to allow the additive pressure equalization space 16 and the inside of the combustion burner to communicate, and to inject the additive into the combustion burner at an angle at which the additive collides with the liquid fuel injected from the liquid fuel injection hole 19.

In FIG. 4, eight of the first additive injection holes 18a are illustrated, but the present embodiment is not limited thereto, and there may be any number of the first additive injection holes 18a, as long as there is one or more. Even when there is a plurality of the first additive injection holes 18a, as the pressure of the additive is equalized in the additive pressure equalization space 16, it is possible to uniformly inject the additive from each of the holes.

As the fuel spray nozzle according to the first embodiment of the present invention is configured such as that described above, the liquid fuel injected from the liquid fuel injection hole 19 and the additive injected from the additive injection holes 18a are caused to collide and it is thus possible to spray the liquid fuel and the additive. In this manner, the mixing of the liquid fuel and the additive is accelerated and it is possible to reduce NOx.

In addition, the swirl vane 12 is a vane that is increasingly curved from upstream to downstream, so that it causes air inside the combustion burner to swirl. As illustrated in FIGS. 1, 3 and 4, by providing the swirl vane 12, it is possible to generate a vortex and further accelerate the mixing of the liquid fuel and the additive after the collision of the liquid fuel and the additive. It is also possible to further accelerate the mixing of air.

Note that, in the fuel spray nozzle according to the first embodiment of the present invention, it is also possible for the injection holes 18a and 19, without the pressure equalization spaces 16 and 17, to allow the respective channels 14 and 15 and the inside of the combustion burner to directly communicate. Furthermore, spraying that is suitable for combustion can be performed by changing an injection angle of each of the injection holes 18a and 19.

Furthermore, although in the above description, the additive channel 14 is provided on the periphery of the liquid fuel channel 15, the present embodiment is not limited thereto, and the positions of the liquid fuel channel 15 and the additive channel 14 may be switched, for example. In addition, the channels 14 and 15 may be arranged so that they are separated from each other. Then, in the above description, each of the channels 14 and 15 is provided in the interior of the fuel spray nozzle 11a, but the present embodiment is not limited thereto, and the additive channel 14 may be arranged inside the swirl vane 12, for example. In this case, the additive pressure equalization space 16 that communicates with the additive 14 and the first additive injection hole 18a are also arranged inside the swirl vane 12.

The fuel spray nozzle according to the first embodiment of the present invention has been described above. Specifically, the fuel spray nozzle according to the first embodiment of the present invention is the fuel spray nozzle 11a that sprays the liquid fuel and the additive inside the combustion burner of the gas turbine. The fuel spray nozzle 11a is provided with the liquid fuel channel 15 for the liquid fuel, the liquid fuel injection hole 19 that is configured to allow the liquid fuel channel 15 and the inside of the combustion burner to communicate and to inject the liquid fuel into the combustion burner, the additive channel 14 for the additive, and the additive injection hole 18a that is configured to allow the additive channel 14 and the inside of the combustion burner to communicate, and to inject the additive into the combustion burner at the angle at which the additive collides with the liquid fuel injected from the liquid fuel injection hole 19.

Furthermore, the fuel spray nozzle 11a may be further provided with the liquid fuel pressure equalization space 17, which is provided between the liquid fuel channel 15 and the liquid fuel injection hole 19 and which has the capacity to equalize the pressure of the liquid fuel that has flowed from the liquid fuel channel 15, and the additive pressure equalization space 16, which is provided between the additive channel 14 and the additive injection hole 18a and which has the capacity to equalize the pressure of the additive that has flowed from the additive channel 14.

Furthermore, the fuel spray nozzle 11a may be further provided with the swirl vane 12 that is increasingly curved from upstream to downstream, so that it causes air inside the combustion burner to swirl.

As described above, with the fuel spray nozzle according to the first embodiment of the present invention, an air blast, a nozzle tip, or the like is not necessary and therefore NOx reduction can be accomplished at low cost.

Second Embodiment

Figure 5:
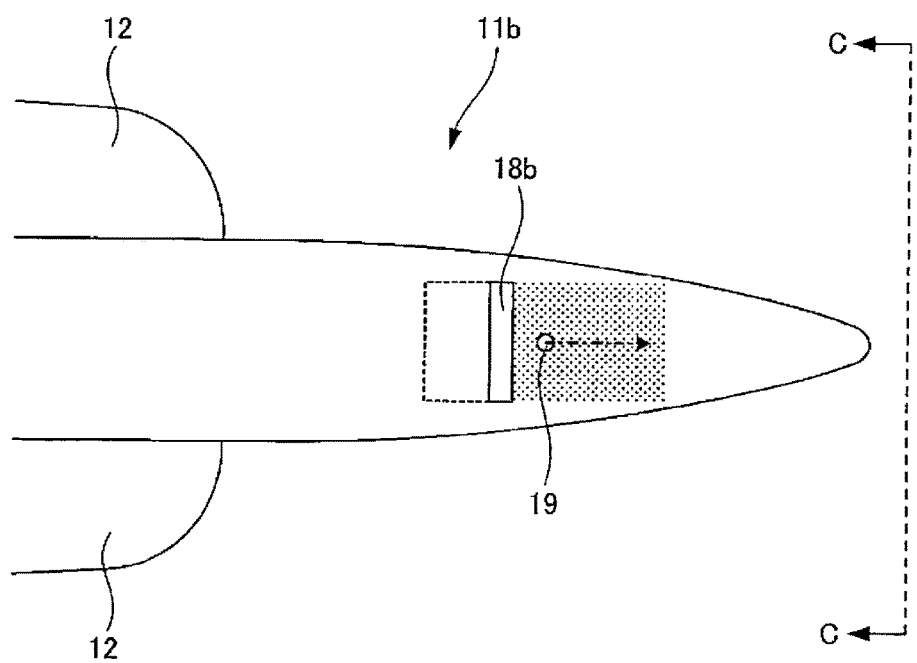
FIG. 5 is a schematic view in which a part of a fuel spray nozzle according to a second embodiment of the present invention is enlarged.
Figure 6:
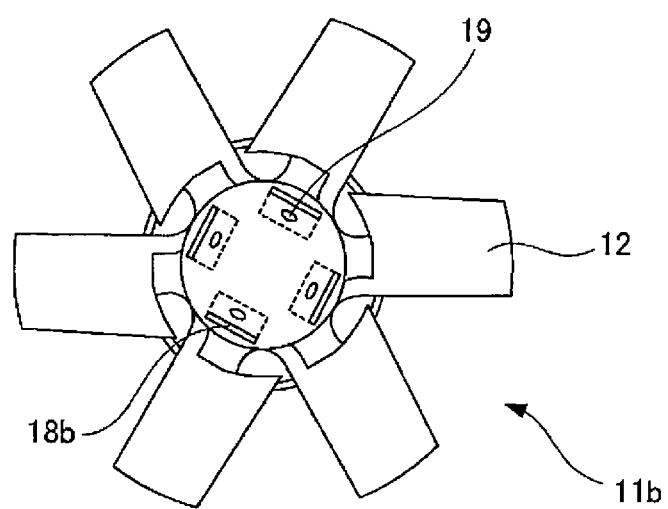
FIG. 6 is a view seen in the direction of arrows C-C in FIG. 5.

A fuel spray nozzle according to a second embodiment of the present invention will be described with reference to the drawings. FIG. 5 is a schematic view in which a part of the fuel spray nozzle according to the second embodiment of the present invention is enlarged. FIG. 6 is a view seen in the direction of arrows C-C in FIG. 5. Furthermore, the long-dashed short-dashed line arrow in FIG. 5 indicates the flow of liquid fuel, and a dotted area indicates an injected additive.

As illustrated in FIGS. 5 and 6, a fuel spray nozzle 11b is provided with the swirl vane 12, a second additive injection hole 18b, the liquid fuel injection hole 19, the additive channel (not illustrated), the liquid fuel channel (not illustrated), the additive pressure equalization space (not illustrated), and the liquid fuel pressure equalization space (not illustrated). Note that the swirl vane 12, the liquid fuel injection hole 19, the additive channel, the liquid fuel channel, the additive pressure equalization space, and the liquid fuel pressure equalization space are similar as those of the first embodiment, and a description thereof is omitted here.

The second additive injection hole 18b is formed by forming the first additive injection hole 18a of the first embodiment as a slit, as illustrated in FIGS. 5 and 6. Areas defined by dashed lines in FIGS. 5 and 6 indicate a state in which the slit of the second additive injection hole 18b is made in a thick section of the fuel spray nozzle 11b.

Then, the second additive injection hole 18b injects the additive into the combustion burner (not illustrated) (to the outside of the fuel spray nozzle 11b) at an angle at which the additive collides with the liquid fuel injected from the liquid fuel injection hole 19. In this case, as the second additive injection hole 18b is a slit, the additive is diffused over a wide range, and the liquid fuel that has collided with the additive is also diffused over a wide range, thus accelerating the mixing of the liquid fuel, the additive, and air to an even greater extent.

In FIG. 6, four of the second additive injection holes 18b are illustrated, but the present embodiment is not limited thereto, and there may be any number of the second additive injection holes 18b, as long as there is one or more. Even when there is a plurality of the second additive injection holes 18b, similarly to the first embodiment, as the pressure of the additive is equalized in the additive pressure equalization space (not illustrated), it is possible to uniformly inject the additive from each of the holes (slits).

Furthermore, in the above description, only the second additive injection hole 18b is formed as the slit, but the present embodiment is not limited thereto. Only the liquid fuel injection hole 19 may be formed as a slit, or both the second additive injection hole 18b and the liquid fuel injection hole 19 may be formed as slits.

The fuel spray nozzle according to the second embodiment of the present invention has been described above. Specifically, in the fuel spray nozzle 11b according to the second embodiment of the present invention, at least one of the liquid fuel injection hole 19 and the first additive injection hole 18a of the first embodiment is formed as a slit.

As described above, with the fuel spray nozzle according to the second embodiment of the present invention, it is possible to further accelerate the mixing of the liquid fuel, the additive, and air, and further NOx reduction can be accomplished.

Third Embodiment

Figure 7:
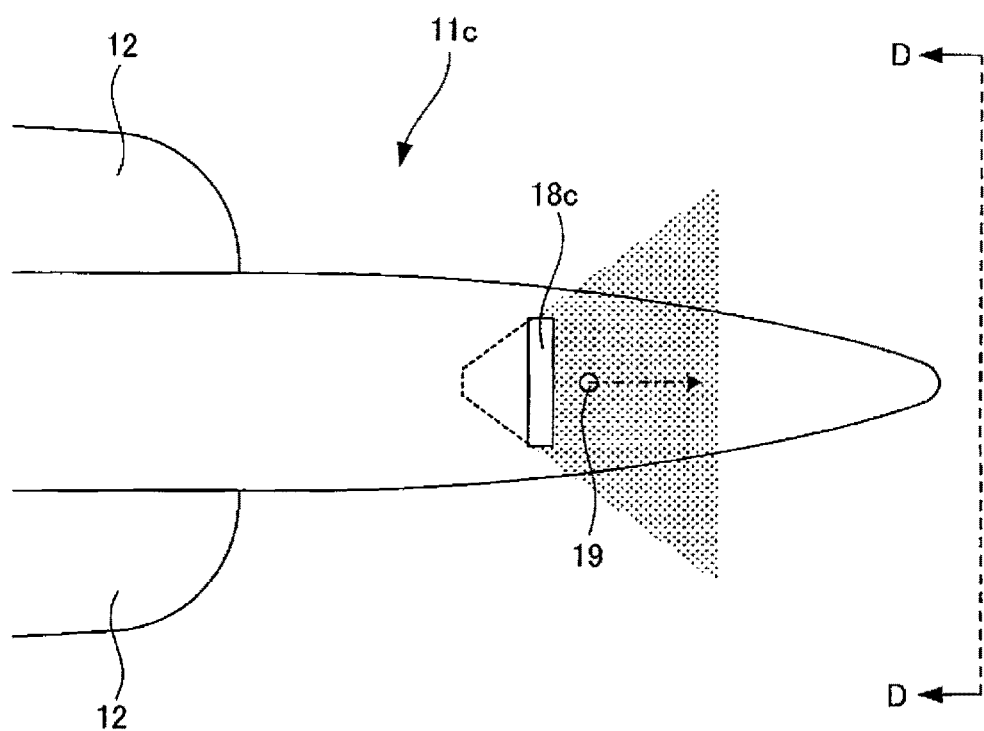
FIG. 7 is a schematic view in which a part of a fuel spray nozzle according to a third embodiment of the present invention is enlarged.
Figure 8:
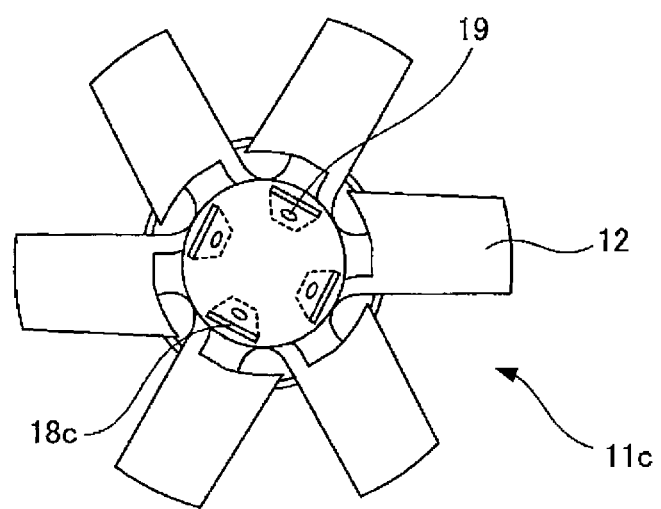
FIG. 8 is a view seen in the direction of arrows D-D in FIG. 7.
Figure 9:
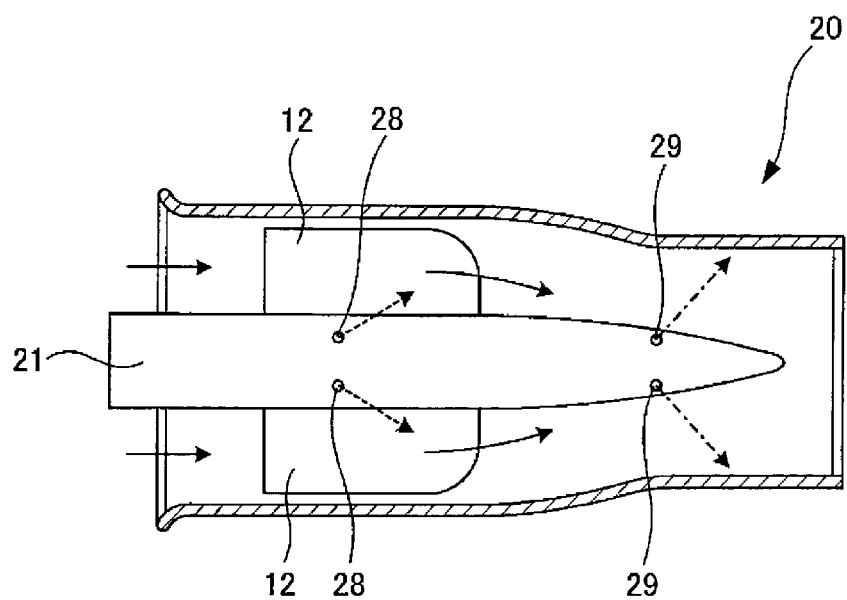
FIG. 9 is a schematic arrow view illustrating an example of an interior of a conventional air-blast type combustion burner.
Figure 10:
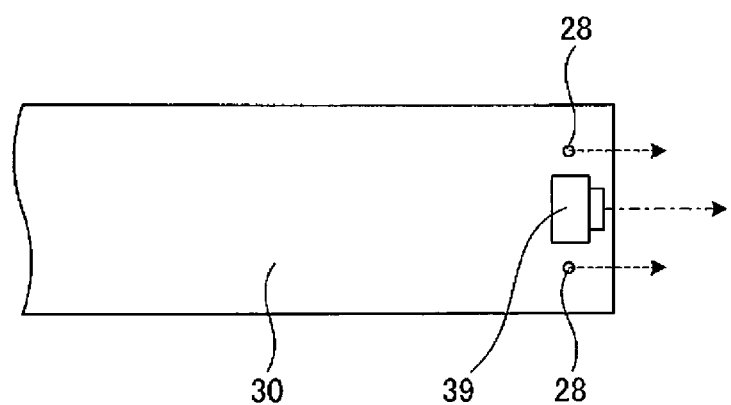
FIG. 10 is a schematic view illustrating an example of a conventional nozzle tip type combustion burner.

A fuel spray nozzle according to a third embodiment of the present invention will be described with reference to the drawings. FIG. 7 is a schematic view in which a part of the fuel spray nozzle according to the third embodiment of the present invention is enlarged. FIG. 8 is a view seen in the direction of arrows D-D in FIG. 7. Furthermore, a long-dashed short-dashed line arrow in FIG. 7 indicates the flow of liquid fuel, and a dotted area indicates an injected additive.

As illustrated in FIGS. 7 and 8, a fuel spray nozzle 11c is provided with the swirl vane 12, a third additive injection hole 18c, the liquid fuel injection hole 19, the additive channel (not illustrated), the liquid fuel channel (not illustrated), the additive pressure equalization space (not illustrated), and the liquid fuel pressure equalization space (not illustrated). Note that the swirl vane 12, the liquid fuel injection hole 19, the additive channel, the liquid fuel channel, the additive pressure equalization space, and the liquid fuel pressure equalization space are similar as those of the first and second embodiments, and a description thereof is omitted here.

Areas defined by dashed lines in FIGS. 7 and 8 indicate a state in which a tapered slit of the third additive injection hole 18c is made in a thick section of the fuel spray nozzle 11c. The third additive injection hole 18c is formed by forming the slit of the second additive injection hole 18b of the second embodiment to have a tapered shape, as illustrated in FIGS. 7 and 8.

Then, the third additive injection hole 18c injects the additive into the combustion burner (not illustrated) (to the outside of the fuel spray nozzle 11c) at an angle at which the additive collides with the liquid fuel injected from the liquid fuel injection hole 19. In this case, as the third additive injection hole 18c is a tapered slit, the additive is injected in a circumferential direction of the fuel spray nozzle 11c and is thus diffused over an even wider range. The liquid fuel that has collided with the additive is also diffused over an even wider range, thus the mixing of the liquid fuel, the additive, and air can be accelerated to an even greater extent.

In FIG. 8, four of the third additive injection holes 18c are illustrated, but the present embodiment is not limited thereto, and there may be any number of the third additive injection holes 18c, as long as there is one or more. Even when there is a plurality of the third additive injection holes 18c, similarly to the first and second embodiments, as the pressure of the additive is equalized in the additive pressure equalization space (not illustrated), it is possible to uniformly inject the additive from each of the holes (slits).

Furthermore, in the above description, only the third additive injection hole 18c is formed as the tapered slit, but the present embodiment is not limited thereto. Only the liquid fuel injection hole 19 may be formed as a tapered slit, or both the third additive injection hole 18c and the liquid fuel injection hole 19 may be formed as the tapered slits.

The fuel spray nozzle according to the third embodiment of the present invention has been described above. Specifically, in the fuel spray nozzle 11c according to the third embodiment of the present invention, the slit of the second embodiment is formed in a tapered shape.

As described above, with the fuel spray nozzle according to the third embodiment of the present invention, it is possible to further accelerate the mixing of the liquid fuel, the additive, and air, and further NOx reduction can be accomplished.

The present invention is suitable as a fuel spray nozzle mounted inside a combustion burner of a gas turbine.

REFERENCE SIGNS LIST

11a Fuel spray nozzle (according to the first embodiment of the present invention)
11b Fuel spray nozzle (according to the second embodiment of the present invention)
11c Fuel spray nozzle (according to the third embodiment of the present invention
12 Swirl vane
14 Additive channel
15 Liquid fuel channel
16 Additive pressure equalization space
17 Liquid fuel pressure equalization space
18a First additive injection hole
18b Second additive injection hole
18c Third additive injection hole
19 Liquid fuel injection hole (according to the first to third embodiments of the present invention)
20 (Conventional) air-blast type combustion burner
21 (Conventional) fuel nozzle
28 (Conventional) additive injection hole
29, 39 (Conventional) liquid fuel injection hole
30 (Conventional) nozzle tip type combustion burner

The invention claimed is:

1. A fuel spray nozzle for spraying liquid fuel and an additive inside a combustion burner of a gas turbine, the fuel spray nozzle comprising:
   a liquid fuel channel for the liquid fuel;
   a liquid fuel injection hole configured to allow the liquid fuel channel and an inside of the combustion burner to communicate, and to inject the liquid fuel into the combustion burner;
   an additive channel for the additive;
   an additive injection hole configured to allow the additive channel and the inside of the combustion burner to communicate, and to inject the additive into the combustion burner at an angle at which the additive collides with the liquid fuel injected from the liquid fuel injection hole; and a liquid fuel pressure equalization space provided between the liquid fuel channel and the liquid fuel injection hole, the liquid fuel pressure equalization space having a capacity to equalize a pressure of the liquid fuel that has flowed from the liquid fuel channel; and an additive pressure equalization space provided between the additive channel and the additive injection hole, the additive pressure equalization space having a capacity to equalize a pressure of the additive that has flowed from the additive channel, a swirl vane disposed upstream of the additive injection hole, wherein the swirl vane is increasingly curved from upstream to downstream, so that air inside the combustion burner is caused to swirl;

wherein the additive injection hole and liquid fuel injection hole are aligned along a longitudinal axis of the fuel spray nozzle and are provided in a side surface of the fuel spray nozzle, and wherein at least one of the liquid fuel injection hold and the additive injection hole is formed as a slit, and the slit has a tapered shape;

wherein the liquid fuel injection hole and the additive injection hole are arranged in directions so that the liquid fuel injected from the liquid fuel injection hole and the additive injected from the additive injection hole respectively inject the liquid fuel and the additive obliquely relative to each other and the liquid fuel injected from the liquid fuel injection hole and the additive injected from the additive injection hole converge so as to collide with each other to thereby spray the liquid fuel and the additive.

2. The fuel spray nozzle according to claim 1, wherein the additive injection hole is disposed upstream of the liquid fuel injection hole.

* * * * *